March 27, 1934.  F. W. MURRAY  1,953,054
TRANSMISSION DEVICE
Filed Feb. 11, 1929  3 Sheets-Sheet 1

Inventor
Frederick W. Murray.
By Walter W. Burns.
Attorney

March 27, 1934.  F. W. MURRAY  1,953,054
TRANSMISSION DEVICE
Filed Feb. 11, 1929   3 Sheets-Sheet 2

Inventor
Frederick W. Murray
By Walter W. Burns
Attorney

March 27, 1934.   F. W. MURRAY   1,953,054
TRANSMISSION DEVICE
Filed Feb. 11, 1929   3 Sheets-Sheet 3

Inventor
Frederick W. Murray.

By Walter W. Burns
Attorney

Patented Mar. 27, 1934 1,953,054

UNITED STATES PATENT OFFICE 1,953,054

TRANSMISSION DEVICE

Frederick W. Murray, Washington, D. C.

Application February 11, 1929, Serial No. 339,184

26 Claims. (Cl. 192—59)

This invention relates to transmission devices and particularly to those devices intended to transmit power at varying speed ratios from one shaft to another.

The primary object of my present invention is the provision of an improved power transmission device for transmitting power between two shafts.

Another object of my invention is the provision of an improved power transmission device for transmitting power at varying speed ratios and having pin and cam connections from one power member to drive movable members having operative connections to the other power member, the construction being such as to cause a constant pull regardless of the speed ratio at which set.

Another and further object of my invention is the provision of an improved power transmission device for transmitting power at varying speed ratios and having pin and cam connections from one power member to drive a reciprocating member in opposite directions by oppositely facing cam faces, there being a pin for each cam, which pin operates substantially half of the time.

Another and still further object of this invention is the provision of an improved power transmission device for transmitting power at varying speed ratios and having a pair of chambers of variable capacity, a reciprocating member for varying the capacity of the chambers, a two-face cam groove in the member and two revolving pins coacting with the faces of the groove so that each pin will revolve in one direction only and in an opposite direction to the other.

Another and still further object of this invention is the provision of a power transmission device for transmitting power at varying speed ratios and having a plurality of pin and cam connections from one power member to another including two pin and two separate cam members so arranged that both pins will not be at the limits of their respective cams at the same time.

Another and still further object of this invention is the provision of an improved power transmission device for transmitting power at variable speed ratios, there being a pair of variable chambers, provision for leakage from the chambers, a chamber to receive the leakage and a pump to keep this latter chamber full, the pump being located in the pin which cooperates with the cam.

Another and still further object of this invention is the provision of a power transmission device for transmitting power at varying speed ratios from one rotating member to another and having a reciprocating member, the reciprocating member being operated by a balanced cam and pin connection with one of the rotating members to cause the operation of the other member at various speed ratios.

Another and still further object of this invention is the provision of a power transmission device having two chambers of variable capacity, a valve for controlling a connection between the two chambers and an improved construction of the valve ports for the valve.

Referring to the drawings wherein a preferred embodiment of my invention is illustrated, Figure 1 is a plan view of my invention.

Fig. 5 is a cross sectional view on the line 5—5 of Fig. 2.

Figure 1:
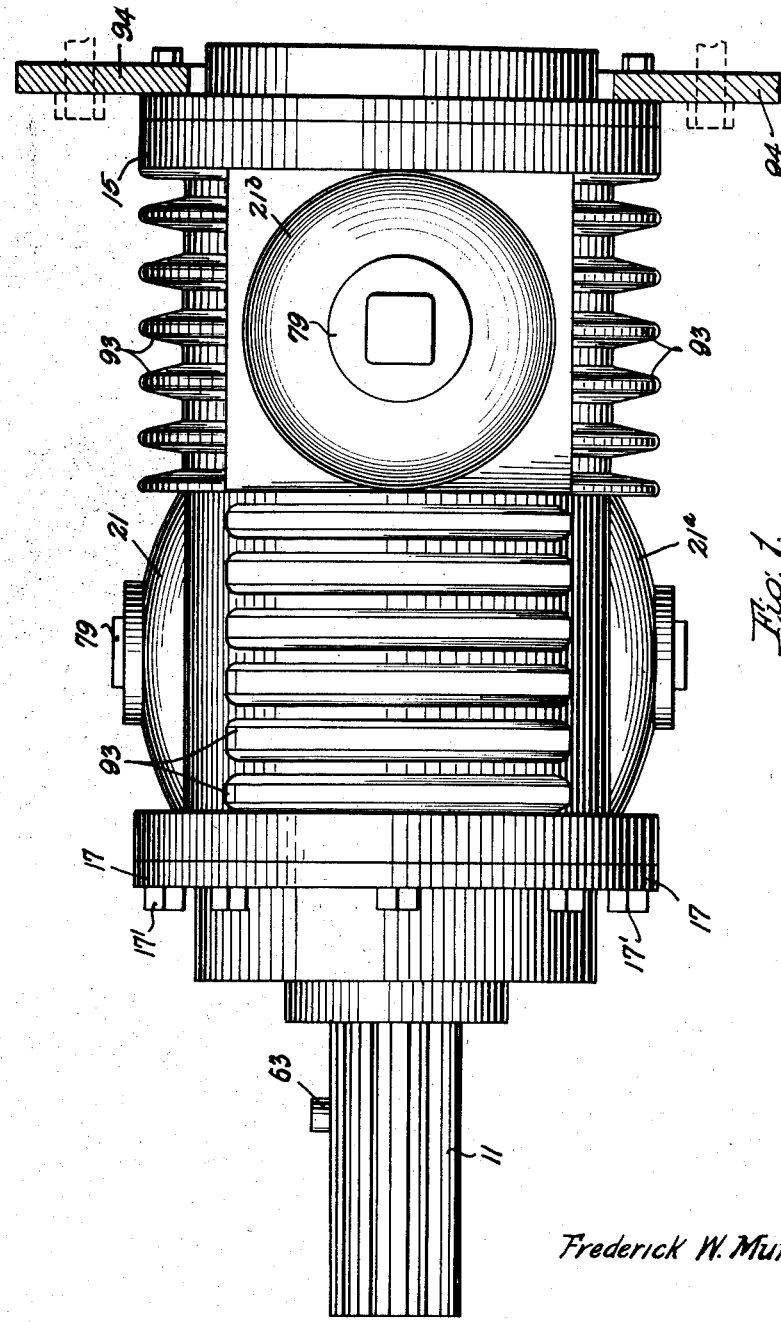

In the drawings, the same or similar parts are designated by the same reference character throughout the views. 10 designates one of the rotary power members and 11 the other rotary power member. In the embodiment of this invention herein illustrated, the power member 10 is intended to be the driving power member and 11 the driven power member.

The power member 10 as illustrated, is in the form of a recessed plate which is provided with a suitable bearing as the ball bearing, the latter having an outer race 12 which occupies a seat in the power member 10. The inner race of the ball bearing, I have designated by the numeral 13 which has a seat on a member carried on the extremity of the other power member 11. Between the two members 12 and 13 are a set of suitable anti-friction members as the balls 14.

Secured to the outer periphery of the power member 10 is a casing member 15 secured in place by the stud bolts 16. This casing 15 extends over the power member 11 and has at its free end a head 17 through which the power member 11 passes, this head member being held in place by the stud bolts 17'.

To maintain the head 17 and the power member 11 in proper relation, I have provided a suitable antifriction bearing. The outer race 18 of this bearing is located in a suitable seat in the head 17.

The inner race 19 is placed on a seat on the power member 11, the antifriction elements as the balls 20 being between the two members 18 and 19. It will be observed that the seats for the members 12, 13, 18 and 19 are such that when the parts are in place, there can be no axial movement between the two power members 10 and 11. In order, however, to get the bearings in their seats, it is necessary to place the bearings and then apply either or both of the members 10 and 17, securing the same by the stud bolts 16 and 17' as will be clear from the later description.

In order to transmit power and motion from one power member to the other, I provide between the power members 10 and 11, means for controlling the relative speed between the two whereby various speed ratios may be had between the limits of one to one and one to infinity, depending upon the setting of the control parts, the proportions and type of fluid medium used. In the form of the invention herein illustrated, I have provided a means for giving a continuous torque transmission between the two power members while they are rotating, regardless of changes in their relative speeds.

An important feature of this invention is the provision of a series of variable capacity high pressure chambers which form a part of the high pressure portion of the fluid system and wherein they come into operation at different times. When these high pressure chambers are being made smaller in capacity they act as pumps, their pumping action being controllable. The parts are so constructed and arranged that when the pumping action is restricted a torque action is transmitted from one power member 10 to the other power member 11 as will be later described. Because of the fact that the high pressure chambers are arranged to be in operation at different times, a continuous torque will be transmitted to the driven power member 11.

The casing 15 is provided with openings into which are placed plugs, as 21, 21ª, 21ᵇ, 21ᶜ, which plugs carry bearings 22, which have antifriction members 23, the latter carrying revoluble pins 24. These plugs 21, 21ª, 21ᵇ, 21ᶜ are suitably secured in the casing 15 by screw threads as at 25. Shoulders 21' are provided on the plugs 21, 21ª, 21ᵇ, 21ᶜ and overlap a coacting surface on the outer side of the casing.

About the power member 11 are slidably mounted two members 26, 26ª, the former being mounted on a cylindrical surface 27', the latter being mounted on a bushing 28 which has an outer cylindrical surface 28' for contact with a correspondingly shaped cylindrical surface on the inner side of the member 26ª.

While the members 26, 26ª are free for limited travel in an axial direction, they are both keyed in such a way that they rotate with and not relative to the power member 11. This key action is brought about through the use of pins 27 which are secured in openings in the edges of the reciprocating members 26, 26ª.

The series of pins 27 extend into the flange 11ª which forms an integral part of the power member 11. The pins are preferably secured in the edges of the reciprocating members 26, 26ª and small enough to freely move in the openings of the flange member 11ª.

Figure 2:
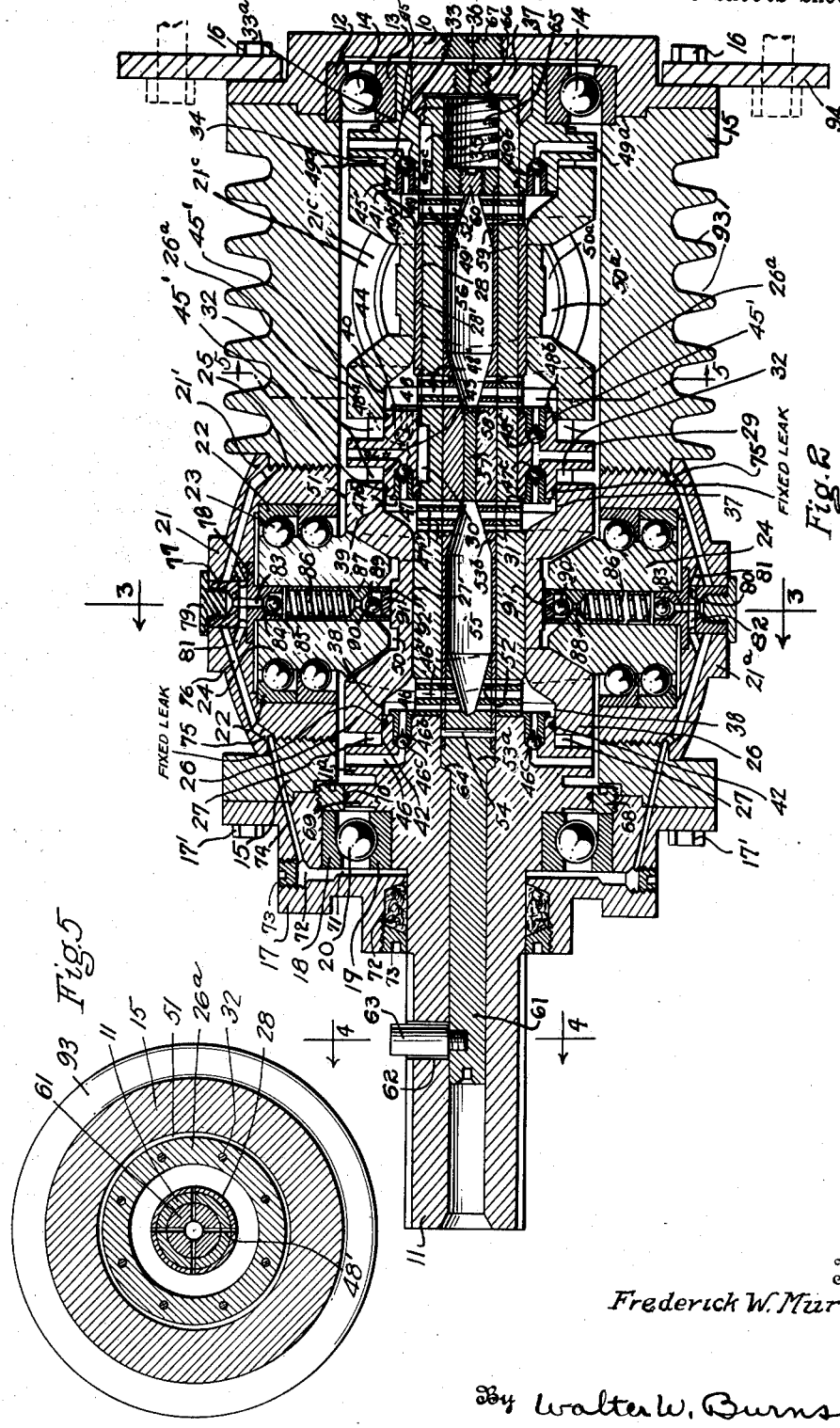
Figure 2 is a longitudinal cross sectional view.
Figure 3:
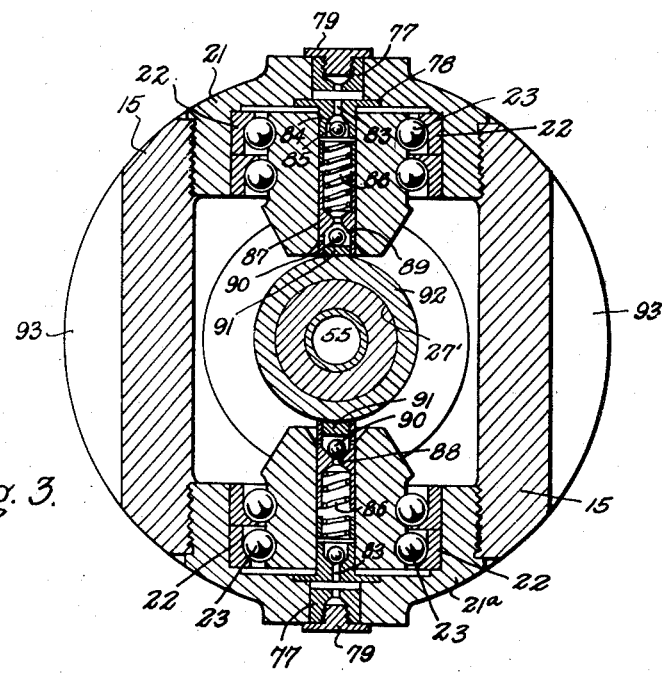
Figure 3 is a transverse cross sectional view on the line 3—3 of Figure 2.
Figure 4:
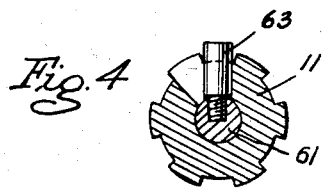
Figure 4 is a cross sectional view on the line 4—4 of Figure 2.

Between the two reciprocating members 26, 26ª is located a flange member 29 which is keyed to the power member 11 by the key 30. This key 30 causes the flange member 29 to be revolved with the power member 11. It will be noted that the power member 11 is provided with a shoulder to the immediate left of the flange member 29 as shown in Fig. 2. This shoulder which I have designated as 31, prevents movement of the flange member 29 to the left as shown in Fig. 2. Its movement to the right is prevented by the presence of the bushing member 28, the edge of which abuts the side of the flange member 29 opposite to the shoulder 31. The flange member 29 is provided with openings in which the pins 32 are freely movable and which may extend from both sides and into openings of the members 26, 26ª.

To the right of the reciprocating member 26ª, as seen in Fig. 2, is a flange member 33 which is connected to reciprocating member 26ª with pins 34 similar in construction and function to the pins 27 already described. This flange member 33 is provided with a shoulder 33ª against which the inner race 13 rests.

The flange member 33 is provided also with a key connection 35 to the power member 11. This key connection 35 prevents the flange member from turning relative to the power member and consequently coacts with its flange member 33, the pins 34, the key 30, the flange member 29 and the pins 32, to prevent the rotary movement of the member 26ª relative to the power member 11 while still permitting it to move along the axis of the power member 11.

It will be observed that the inner end of the power member 11 is threaded as shown at the right end thereof in Fig. 2. It will also be noted that the flange member 33 is recessed at 36 adjacent to this threaded end of the power member 11. In this recess 36 and in cooperation with the threaded end of the power member 11 is a cap nut 37. It will be noted that by tightening the cap nut 37, the flange member 33 will be firmly held against the end of the bushing 28 which, in turn, presses firmly against the flange member 29, the latter being held to the shoulder 31.

It is thus clear that the parts 11, 29, 30, 33, 35, and 37 all are as a rigid member during operation. The sleeve 28 is firmly held to these members although not keyed thereto. Such a key connection is not desirable as no particular relative position is necessary.

The reciprocating members 26, 26ª, as already stated are slidable endwise on the bearings 27' and 28'. As these members reciprocate, the pins 27, 32 and 34, alternately pass deeper into and recede from their respective openings in the members 11ª, 29 and 33 in a way similar to a slidable key—the members 26, 26ª rotating with the power member 11, but being free to slide axially during rotation.

The members 26, 26ª have cylindrical surfaces within each end. These surfaces, I have designated 38, 39, 40, 41 respectively. Cooperating with these surfaces 38, 39, 40, 41 are outside cylindrical surfaces 42, 43, 44, 45. The cylindrical surface 42 is located on the outer surface of the flange 11ª. The cylindrical surfaces 43, 44 are on opposite sides of the flange member 29 and the cylindrical surface 45 is located on the flange member 33. Between the surfaces 38, 39, 40, 41 and their respective coacting surfaces 42, 43, 44 and 45 are suitable packing rings 45' which retard the leak at the fixed fluid outlet from the variable capacity fluid pressure chambers to be presently described.

In the embodiment herein illustrated, I have shown a series of chambers 46, 47, 48 and 49 which are provided as a part of the high pressure portion of the fluid system and are variable in capacity.

These chambers 46, 47, 48 and 49 are controlled as to their respective capacities by the reciprocating movements of the slidably mounted members 26, 26ᵃ in a direction along the axis of the power member 11.

As already stated, there are provided a plurality of variable capacity high pressure chambers. As herein illustrated, these chambers are arranged in pairs, the chambers 46, 47, being arranged at opposite ends of the reciprocating member 26 and the chambers 48 and 49 being at opposite ends of the reciprocating member 26ᵃ.

These members 26, and 26ᵃ are each provided with a cam slot having two independent cam surfaces. The cam slot of the member 26 is designated by the numeral 50 and that of the member 26ᵃ by the numeral 50ᵃ. In these slots are located the inner conical ends of the pins 24. The sides of the cam slots are so cut that a plane which cuts a section through the axis of either the member 26 or the member 26ᵃ will cut the cam surface on a line. When the inner conical end of the pin 24 is in contact with its wall of the cam slot, the two lines of contact, if extended, will meet the axis of the cone in the axis of the driving and driven power members 10 and 11. In other words, the inner conical end of the revolving pin 24, has a rolling contact with the wall of the cam slot.

It is to be noted that opposite pins 24 are placed slightly off-set relative to each other in a direction parallel to the axis of the reciprocating member 26. The same is true of the pins 24 in the cam slot 50ᵃ. The purpose of this off-set will presently appear.

The cam slot is so arranged that the reciprocating member 26 will reciprocate axially as the rotating pin 24 is revolved bodily through the slot 50. Assuming the power member 11 to be in a non-rotative condition, it is clear that the reciprocating member 26 will also remain non-rotative. If now we assume rotation of the power member 10, the pins 24 are revolved bodily, the sides of the respective inner conical ends of these revolving pins 24 will contact, due to the aforementioned off-set, with only one side. The cam slots are constructed to have two projecting and two receding portions on each cam slot wall, the receding portions registering with the projecting portions of the opposite cam slot wall. In other words the cam slot has a substantially constant cross section.

It will be clear that during operation, if one conical end of the pin 24 engaged both side walls of the cam slot alternately while the relative rotation of the power members 10 and 11 remained the same, then the pin 24 would have to reverse its rotation. In order to keep the pins 24 rotating in the same direction on their respective axes, I have placed the axes of the opposite pins 24 in off-set positions as already mentioned.

Outward of the members 26, 26ᵃ, is a low pressure chamber 51 which chamber is always at a low pressure. A one-way connection is provided to each of the high pressure chambers 46, 47, 48 and 49 from this low pressure chamber 51. This one way communication between the low pressure chamber 51 and the interiors of the chambers 46, 47, 48, 49, permits fluid to freely pass from the low pressure chamber to the respective high pressure chambers 46, 47, 48 and 49, when the latter are increasing in capacity, but prevents any communication between the low pressure chamber and any high pressure chamber which is decreasing in size—in other words when it is performing any pumping action.

These communicating passages are located adjacent the high pressure chambers 46, 47, 48 and 49 and are designated 46ᵃ, 47ᵃ, 48ᵃ, and 49ᵃ. In the ends of the respective passages adjacent the high pressure chambers, are plugs 46ᵇ, 47ᵇ, 48ᵇ, 49ᵇ. These plugs may be screwed in place or they may be made to produce a press fit and pressed into place. The openings to receive the plugs 46ᵇ, 47ᵇ, 48ᵇ, and 49ᵇ, are larger than the passages 46ᵃ, 47ᵃ, 48ᵃ, 49ᵃ and are provided at their inner ends with openings which enclose suitable valves as the ball valves 46ᶜ, 47ᶜ, 48ᶜ 49ᶜ. These valves close when the pressure is greater in the high pressure chambers 46, 47, 48, 49, than in the low pressure chamber 51, but open as soon as the pressure is less in a high pressure chamber than in the low pressure chamber 51.

In the embodiment illustrated, the fixed or predetermined leak from the chambers 46, 47, 48, 49 to the low pressure chamber 51 is past the packings 45'. In order to control and regulate the pumping action of the reciprocating members 26, 26ᵃ, as they move back and forth, to vary the capacities of the chambers 46, 47, 48, 49, I provide a regulatable outlet for the fluid as it comes from the respective chambers 46, 47, 48, 49. By regulating the fluid as it is pumped and as it passes from the variable pressure chambers, the power transmitted to the driven member is controlled and regulated. This is due to the fact that as the pin 24 impinges against the side wall of the cam slot 50 or 50ᵃ, there is a tendency to both turn the member 26 or 26ᵃ, as well as to tend to cause it to reciprocate. When the power member 10 is turned, if the reciprocation is retarded or stopped, then rotary motion will be transmitted to the power driven member 11.

As already indicated, the retardation of the reciprocatory motion can be brought about by regulating the rate of decrease in volume of the respective high pressure chambers 46, 47, 48 and 49. In order to bring about this control, I provide each chamber with a series of openings, 46', 47', 48', and 49'. These openings extend radially and correspond to similar openings 52 in a valve 53. This valve 53 is composed of two sections, 53ᵃ and 53ᵇ. These two sections are secured together by the pins 54.

The valve 53 has two chambers 55, 56 which are separated by the plug 57. This plug 57 is cylindrical and secured in place by the threads 58. The end of the chamber 56 is closed by a closure plug member 59. This plug member 59 is secured in the section 53ᵇ of the valve by any suitable means (not shown) as by pins similar to the pins 54. The closure plug member 59 is provided with a plug 60 for effectually closing the chamber 56.

It is to be noted that the chamber 55 may be connected to the chambers 46 and 47 by the openings 46', 47' and the valve openings 52. The same is true of the chamber 56 which is connected to the high pressure chambers 48, 49 by the openings 48', 49' and the valve openings 52.

The valve 53 being cylindrical on its outer surface, fits a corresponding surface in the power member 11. The valve 53 is provided with a stem 61 which extends axially in a cylindrical opening in the power member 11. The power member 11 is provided with an arcuate slot 62 in which is an operating pin 63 for turning the valve 53.

A ground conical joint 64 is placed at the junction of the stem 61 and the valve 53. In order to hold the valve 53 in place on the seat 64, there is provided between the closure plug member 59 and the cap nut 37, a spring 65 which is under tension at all times.

During the assembly of the valve, the member 57 is reached through the opening normally filled by the plug 60 which is larger than the member 57. To reach the plug 60, successively larger plugs 66, in the cap nut 37, and 67, in the power member 10, are provided.

To hold the bearing race 18 in position is a retaining ring 68, having an engagement on its outer surface with screw threads of the head 17. On its inner surface is a smooth cylindrical surface which is in close proximity to the flange 69 of the power member 11. It will be noted that the low pressure chamber 51 is adjacent the two adjacent surfaces between the ring 68 and the flange 69. As the former revolves with the power member 10 and the latter revolves with the power member 11, there are adjacent moving surfaces. The chamber 51 is under low fluid pressure. However, it is necessary to provide means for prevention of leakage. The packing ring 70 is, therefore provided between these two adjacent surfaces.

When the high pressure portion and the low pressure portion of the fluid system is filled with fluid and the whole becomes warm, a certain amount of the fluid necessarily passes the packing ring 70 and enters the outer replenishing chamber 71 between the races 18 and 19. Outward of this outer chamber 71 is a packing 72 between the head 17 and the driven power member 11. This packing is held in place by a gland 73 which has a screw threaded engagement with the head 17.

The packing 72 acts to prevent loss of fluid when the device is at rest and also has a tendency to hold a vacuum in the replenishing chamber when the parts cool after having been warmed during operation and during which time some fluid may have been forced out by expansion.

Extending outward of the chamber 71 are a plurality of openings 72 which are closed by screw threaded plugs 73. From the sides of the openings 72, extend passages 74 which extend through the head 17 and the wall of the member 15 to the place occupied by large plugs 21 and 21ª.

The large plugs 21 and 21ª are provided with a groove 75 at the point where the end of the passage 74 opens. From this groove 75 extends a plurality of passages 76, inwardly toward the center of the plugs 21 and 21ª.

At the center of the plug 21 is provided an opening in which is placed the outer end of what might be termed a pump base 77. The base 77 has a flange 78 fitting an appropriate recess in the plug 21. The base 77 is held in place by a cap screw 79 which has a flange extending beyond the sides of the opening in which the base 77 is inserted.

Outwardly of the flange 78 is a groove 80 which is connected with the passages 76 by passages 81. Openings 82 connect the groove 80 with a center passage 83. The center passage 83 extends inwardly to a chamber 84 in which is located a ball valve 85. In an enlarged inner end of the chamber 84 is one end of a spring 86. The other end of this spring 86 is in engagement with a recess in the end of a plunger 87.

Intermediate the ends of the plunger 87 is an opening 88 which connects with the chamber 89. Having a seat in the outer end of this chamber 89 is a ball valve 90.

At the inner end of the plunger 87 is a cam contacting head 91. This cam contacting head 91 is in constant contact with a cam 92 in the bottom of the cam slot 50. Any relative movement between the power member 10 which carries the pump plunger 87 about the power member 11 which carries the cam 92 will cause the cam 92 to operate the plunger 87 in its chamber in the pin 24.

If we assume that, due to the expansion by heat, the fluid leaks past the packing ring 70, into the replenishing chamber 71, the centrifugal force of the revolving parts will force the fluid to the outer passages 74, 76, 81, 82 and 83. As the plunger moves inwardly under the action of the spring 86 and the cam 92, the fluid will force the ball valve 85 inwardly off of its seat and fill the chamber 84 and the space around the spring 86. When the plunger 87 is pressed outwardly under the action of the cam 92 and against the action of the spring 86, this action causes the valve 85 to become seated and the valve 90 to become unseated forcing the fluid out into the cam slot 50, which as is obvious, forms a part of the low pressure chamber 51.

If, due to the efficient action of the pump plunger 87, there is too much fluid pumped into the low pressure chamber 51, no harm is done as it simply passes into the replenishing chamber and is again pumped back into the low pressure chamber.

In order to assist in keeping the device as a whole, cool; I have provided fins 93.

Any suitable means may be provided for shifting the position of the pin 63 relative to the power member 11 and in the slot 62. A convenient means is illustrated in my copending applications, Serial Number 41,192 and Serial Number 120,198.

Flanges 94 may be provided to secure the driving member to the prime mover as the fly wheel of a motor.

I will now describe the operation of my device as a whole.

As the prime mover, which supplies the motive power, revolves, the power member 10 and the casing 15 are turned therewith. The casing 15 carries the two sets of pins 24 around in bodily revolution. Due to the relative motion between the driven member 11 and the casing 15 and the shape of the cam slots 50, 50ª, the members 26, 26ª, which are keyed to the driven member 11 so as to have axial movement only, will be caused to reciprocate twice in each direction during each revolution of the casing 15 relative to the driven member 11. Since the revoluble pins 24 contact each with only one side of the cam slot, they rotate on their axes continuously in one direction; the opposite pins rotating in opposite directions.

As long as the chambers 46 and 47 and the chambers 48 and 49 communicate freely each with the opposite one of its pair, through the chambers 55 and 56 respectively, there will be no movement transmitted from the casing 15 to the driven member 11.

When, however, the valve 53 is operated to partially close the openings 52, the reciprocation of the members 26, 26ª is retarded. This causes the revoluble pins 24 to press harder against the sides of the respective cam slots in their attempt to reciprocate the members 26, 26ª.

This prevention of the free reciprocal movement of the members 26, 26ª, causes the members 26, 26ª to be carried around in the same direction as the rotation of the casing 15. And since the members 26, 26ª are keyed to the driven member 11, the latter is also caused to rotate.

As the valve 53 is further closed more pressure is built up within the chambers 46, 47, 48 and 49. It is impossible to prevent all leakage between any two relatively moving parts, where differences in pressure are involved. Consequently it is impossible to prevent leakage past the contacting surfaces 38, 39, 40, 41 and their respective coacting surfaces 42, 43, 44, 45. To offset this leakage, there is made provision for returning an amount, equal to the leakage at these points, to the high pressure portion of the fluid system. As already described, the passages 46a, 47a, 48a and 49a permit passage of fluid from the low pressure chamber 51 to the respective chambers 46, 47, 48, 49, but not in a reverse direction.

During the reciprocation of the members 26, 26a, it will be observed that one high pressure cylinder of each of the pairs 46, 47, 48, and 49 will have its fluid under low pressure during the time its mate has high pressure. As the leak takes place from the high pressure chamber 46, 47, 48, or 49, past the packings 45' and into the chamber 51, the other of the pair will draw through its coacting channel 46a, 47a, 48a, or 49a from the chamber 51, an amount of fluid equal to the leakage. There is also a leak along the surface 27 or the surface 28 to the opposite high pressure chamber. At the same time an amount of fluid is forced into one of the chambers 46, 47, 48, or 49 then not under high tension from its mate which is under high pressure through the ports 52 by way of the chamber 55 or 56 in the valve 53. As soon as the member 26 or 26a reverses its movement, the high pressure chamber 46, 47, 48 or 49 which was under high pressure, releases its fluid, the adjacent valve 46c, 47c, 48c, or 49c releases and is then ready to receive an amount of fluid equal to that which leaks from its opposite chamber during the next stroke then just beginning.

At the end of each stroke there is a small increment of time when there is no coaction between the pins 24 of a pair and the walls of their cam slot. Without some provision for preventing the occurrence of a dead time when the pins 24 could make a quick forward movement without affecting the driven member 11, a jerky action would be given the whole transmission. To overcome this, the members 26, 26a are so keyed to the driven member 11 that when either is at the end of its stroke, the other will be in the middle of its stroke. In this way when one member 26, 26a is at the end of its stroke, the other will have one of its chambers under high pressure. This produces a continuous torque on the driven member for any given speed of the driving member and setting of the valve 53.

If, due to expansion of the fluid within the low pressure chamber 51, leakage past the packing 70 should occur into the replenishing chamber 71, it will immediately by centrifugal force be thrown out to the passages 72, 74, 75, 76 and if more than a small amount of fluid is present, will be forced into the passages 81 to the passage 83 outwardly of the ball 85.

The coaction of the cam 92 and the spring 86 to operate the pump plunger 87, will pump the oil through the plunger, 87, past the valve 90 and back into the low pressure chamber as already described.

It is thus clear that in this invention there is provided a device for transmitting power at varying speed ratios.

The fluid which I have found to be suitable is oil. I have found also that the best results are obtained through the use of oil from which the air or other gas has been removed. This evacuated oil may be obtained in one of several different ways. The oil may have the air or other gas removed by heating while the atmospheric pressure is removed from the surface of the oil after which the oil is cooled while not in the presence of air. It has also been found that a part of the air or other gas may be removed by filling the transmission device and placing the same in operation and then cooling the whole mass. The air or other gas will be forced or drawn by vacuum out of the fluid and when the device has ceased operating, it will collect at the high points. By placing the plugs 79 and 73 or other plugs at the highest points, the air will collect at these points. The plugs 73, 79 are not removed until after the whole mass has cooled. The air spaces are then filled with additional oil. The plugs may then be replaced. It was found that with this evacuated oil the device ran without excessive heat.

While there is illustrated and described in detail one embodiment of this invention, it is to be understood that there is no intention to limit the invention to the details set forth and that modifications and changes may be made without departing from the spirit of the invention and within the scope of the appended claims.

Having described my invention what I claim and desire to secure by Letters Patent is:—

1. A power transmission device comprising relatively rotatable means, a fluid system comprising low pressure and high pressure portions, the high pressure portion comprising a series of variable capacity fluid pressure chambers, each chamber having a controllable fluid outlet and a fixed fluid outlet, the fixed outlet discharging into the low pressure portion of the fluid system and means for conducting an amount of fluid to the high pressure portion of the system equal to the amount of the discharge.

2. A power transmission device comprising relatively rotatable means, a fluid system comprising low pressure and high pressure portions, the high pressure portion comprising a series of variable capacity fluid pressure chambers, each chamber having a controllable fluid outlet and a fixed fluid outlet, the fixed outlet discharging into the low pressure portion of the fluid system and means for conducting an amount of fluid to the high pressure portion of the system equal to the amount of the discharge, the chambers being so placed relatively as to have at least one chamber with a decreasing capacity at all times during the operation of the device.

3. A power transmission device comprising relatively rotatable means, a fluid system comprising low pressure and high pressure portions, the high pressure portion comprising a series of variable capacity fluid pressure chambers, each chamber having a controllable fluid outlet and a fixed fluid outlet, the fixed outlet discharging into the low pressure portion of the fluid system, means for conducting an amount of fluid to the high pressure portion of the system equal to the amount of the discharge, a replenishing chamber outward of the low pressure chamber and a pump connected to the low pressure chamber to pump from the replenishing chamber to the low pressure chamber.

4. A power transmission device comprising relatively rotatable means, a fluid system comprising low pressure and high pressure portions, the high pressure portions comprising a plurality of pairs of variable capacity fluid pressure chambers, each chamber having a controllable fluid outlet connected to another chamber through a passage, a valve for controlling the passage, a fixed fluid outlet, the fixed outlet discharging into the low pressure portion of the fluid system and means for conducting an amount of fluid to the high pressure portion of the system equal to the amount of the discharge.

5. A power transmission device comprising relatively rotatable means, a fluid system comprising low pressure and high pressure portions, the high pressure portion comprising a plurality of pairs of variable capacity fluid pressure chambers, each chamber having a controllable fluid outlet connected to another chamber through a passage, a valve for controlling the passage, a fixed fluid outlet, the fixed outlet discharging into the low pressure portion of the fluid system and means for conducting an amount of fluid to the high pressure portion of the system equal to the amount of the discharge, the chambers being so placed relative to each other as to have at least one chamber with a decreasing capacity at all times during the operation of the device.

6. A power transmission device comprising relatively rotatable means, a fluid system comprising low pressure and high pressure portions, the high pressure portion comprising a plurality of pairs of variable capacity fluid pressure chambers, each chamber having a controllable fluid outlet connected to another chamber through a passage, a valve for controlling the passage, a fixed fluid outlet, the fixed outlet discharging into the low pressure portion of the fluid system, means for conducting an amount of fluid to the high pressure portion of the system equal to the amount of the discharge, a replenishing chamber outward of the low pressure chamber and pumping means connecting the replenishing chamber with the low pressure chamber to force fluid from the replenishing chamber to the low pressure chamber.

7. A power transmitting device comprising a rotary driving member and a rotary driven member, a driving connection between the two members, the connection comprising a cylinder movable axially, but rotatably with one of the members, a piston rigid with the same member, a chamber therebetween, the cylinder having a cam slot in its outer surface, two cooperating devices extending from the other member and into the cam slot, at different points, the cooperating devices having contact with opposite faces of the cam slot.

8. A power transmitting device comprising a rotary driving member and a rotary driven member, a driving connection between the two members, the connection comprising a cylinder movable axially, but rotatably with one of the members, a piston rigid with the same member, a chamber therebetween, the cylinder having a cam slot in its outer surface, two circumferentially spaced cooperating devices extending from the other member and into the cam slot, at different points, the cooperating devices having contact with opposite faces of the cam slot.

9. A power transmitting device comprising a rotary driving member and a rotary driven member, a driving connection between the two members, the connection comprising a cylinder movable axially, but rotatably with one of the members, a piston rigid with the same member, a chamber therebetween, the cylinder having a cam slot in its outer surface, two cooperating devices extending from the other rotary member and substantially 180° apart, offset from each other so that they engage opposite sides of the cam slot.

10. A power transmitting device comprising a rotary driving member and a rotary driven member, a driving connection between the two members, the connection comprising a double cylinder movable axially, but rotatable with one of the members, two pistons rigid with the same member, each coacting with one end of the double cylinder, the cylinder having a cam slot in its outer surface, two spaced cooperating devices extending from the other member and into the cam slot, the cooperating devices having contact with opposite faces of the cam slot.

11. A power transmitting device comprising a rotary driving member and a rotary driven member, a driving connection between the two members, the connection comprising a cylinder movable axially, but rotatably with one of the members, a piston rigid with the same member, a chamber therebetween, the cylinder having a cam slot in its outer surface, and provided with slanting sides, two cone-shaped cooperating devices extending from the other member and into the cam slot, the cooperating devices having contact with opposite faces of the cam slot.

12. A power transmitting device comprising a rotary driving member and a rotary driven member, a driving connection between the two members, the connection comprising a cylinder movable axially, but rotatably with one of the members, a piston rigid with the same member, a chamber therebetween, the cylinder having a cam slot, with slanting sides, in its outer surface, two cooperating conical devices extending from the other rotary member and substantially 180° apart, offset from each other so that they engage opposite sides of the cam slot.

13. A power transmitting device comprising a rotary driving member and a rotary driven member, a driving connection between the two members, the connection comprising a piston and cylinder both rotatable with one of the members, a pair of conical pin and two-face correspondingly-shaped cam connections cooperatively connecting the other member to cause movement therefrom to be transmitted to bring about relative movement between the piston and cylinder to vary the capacity of the chamber, the conical pins having separate axes.

14. A power transmitting device comprising a rotary driving member and a rotary driven member, a driving connection between the two members, the connection comprising a double cylinder movable axially, but rotatable with one of the members, two pistons rigid with the same member, each coacting with one end of the double cylinder, the cylinder having a cam slot having slanting sides and being in the outer surface of the cylinder, two spaced tapered devices extending from the other member and into the cam slot in position to cooperate with the walls thereof, the cooperating devices having contact respectively with opposite faces of the cam slot.

15. A power transmitting device comprising a driving member and a driven member, a driving connection between the two members, the connection comprising a double cylinder movable axially, but rotatable with one of the members, two pistons rigid with the same member, each coacting with one end of the double cylinder, the cylinder having a cam slot having slanting sides and being in the outer surface of the cylinder, two spaced revoluble conically shaped rollers extending from the other member and into the cam slot, the rollers having contact respectively with opposite faces of the cam slot.

16. A power transmitting device comprising a driving member and a driven member, a driving connection between the two members, the connection comprising variable chambers and a reciprocating member controlling the capacity of the chambers, the reciprocating part revolving with one member and having two cam groove faces, two spaced conical revolving members extending from the other member and in position in the groove to engage a respective cam face to cause the variation of the capacity of the chambers, the conical members having non-coincident axes and a fluid connection from the chambers and a valve controllable at will for controlling the ingress and egress of fluid to and from the chambers, any decrease in the capacity of one chamber being the same as the increase in capacity of the other and at the same time.

17. A power transmitting device comprising a driving member and a driven member, a driving connection between the two members, the connection comprising variable chambers and a reciprocating member controlling the capacity of the chambers, the reciprocating part revolving with one member and having two cam faces, two conical revolving members extending from the other member and in position to engage a respective cam face to cause the variation of the capacity of the chambers and a fluid connection between the chambers and a rotary valve controllable at will for controlling the ingress and egress of the fluid to and from the chambers and located at the axis of the rotary members, any decrease in the capacity of one chamber being the same as the increase in capacity of the other and at the same time.

18. A power transmitting device comprising a rotary driving member and a rotary driven member, a driving connection between the two members, the connection comprising variable chambers and a reciprocating member controlling the capacity of the chambers, the reciprocating part revolving with one member and having two cam faces, two conical revolving members extending from the other member and in position to engage a respective cam face to cause the variation of the capacity of the chambers, and a fluid connection from the chambers and a valve controllable at will for controlling the ingress and egress of fluid to and from the chambers and located at the axis of the rotary members, any decrease in the capacity of one chamber being the same as the increase in capacity of the other and at the same time, and a fluid connection between the chambers.

19. A power transmitting device comprising a rotary driving member and a rotary driven member, a driving connection between the two members, the connection comprising variable chambers and a reciprocating member controlling the capacity of the chambers, the reciprocating part revolving with one member and having two cam faces, two conical revolving members extending from the other member and in position to engage a respective cam face to cause the variation of the capacity of the chambers, and a fluid connection from the chambers and a valve controllable at will for controlling the ingress and egress of fluid to and from the chambers, any decrease in the capacity of one chamber being the same as the increase in capacity of the other and at the same time, said valve being at the axis of one of the rotary members and having a space therein, the chambers being connected through the wall of the valve to the space by openings having their axes pointing toward substantially the same point.

20. A power transmitting device comprising a rotary driving member and a rotary driven member, a driving connection between the two members, the connection comprising two pairs of oppositely disposed cam faces revolving with one of the members and two pairs of cooperating devices reloving with the other member for coaction with the cam faces respectively, the cams being so placed relative to each other that the relative movement between the cam faces and cooperating devices will be out of synchronism, the cooperating devices of the pairs being spaced opposite each other, the corresponding cooperating devices of different pairs being spaced substantially 90° apart.

21. A power transmitting device comprising a rotary driving member and a rotary driven member, the two members being coaxial, a driving connection between the two members, the connection comprising two sets of relatively movable pistons and cylinder means having four chambers, said means controlling the capacities of four chambers, the pistons and cylinder means being coaxial with the members, two pairs of cam and pin connections between the cylinder and piston means, and one of the members, one set of connections being spaced at 90° from the corresponding parts of other set of connections.

22. A power transmitting device comprising a rotary driving member and a rotary driven member, the two members being coaxial, a driving connection between the two members, the connection comprising stationary pistons and axially movable cylinders rotatable with one of the members, each cylinder having a pair of chambers and in cooperative relation with two pistons, each axially movable cylinder being provided with two cam faces, a pin device mounted on the other member, for each cam surface and in position to cooperate therewith, two of the pin devices being positioned to move the respective cylinders axially in one direction and two being positioned to move them in the opposite direction, corresponding pin devices of different pairs being angularly spaced substantially 90° apart.

23. A power transmitting device comprising a rotary driving member and a rotary driven member, the two members being coaxial, a driving connection between the two members, the connection comprising stationary pistons and axially movable cylinders, the pistons and cylinders rotatable with one of the members, each cylinder having a pair of chambers and in cooperative relation with two of the pistons, each axially movable cylinder being provided with a cam slot having two walls, two pin devices in each cam slot and revolving with the other member, the pin devices of each slot contacting with the respective sides of the slot, corresponding pin devices in different slots being arranged at an angle so that one pin member and cam surface will at all times be changing the capacity of a chamber between a cylinder and piston.

24. A power transmission device comprising a driving member and a driven member, a driving connection between the two members, the connections comprising a part having reciprocating movement to vary the capacity of a chamber, means for reciprocating the reciprocating part, including cam means having a plurality of cam faces and a revolving cooperating device for each cam face, each cooperating device having its own cam face and being mounted on non-coincident axes.

25. A power transmission device comprising a driving member and a driven member, a driving connection between the two members, the connections comprising a part having reciprocating movement to vary the capacity of a chamber, means for reciprocating the reciprocating part including cam means having a plurality of cam faces and revolving cooperating devices for each cam face, the cooperating devices having their own cam engaging faces and being mounted on opposite sides of the reciprocating means and having non-coincident axes.

26. A power transmission device comprising relatively rotatable means, a fluid system comprising low pressure and high pressure portions, the high pressure portion comprising a plurality of pairs of variable capacity fluid pressure chambers, each chamber having a controllable fluid outlet connected to another chamber through a passage, a valve for controlling the passage, a fixed fluid outlet, the fixed outlet discharging into the low pressure portion of the fluid system, means for conducting an amount of fluid to the high pressure portion of the system equal to the amount of the discharge, a replenishing chamber outward of the low pressure chamber and pumping means connecting the replenishing chamber with the low pressure chamber to force fluid from the replenishing chamber to the low pressure chamber each pair of variable capacity fluid pressure chambers being controlled by a plurality of cam surfaces and cam-surface-coacting members, each cam-surface-coacting member engaging its own cam surface and its mate engaging another cam surface.

FREDERICK W. MURRAY.